United States Patent
Soler et al.

(10) Patent No.: US 8,098,721 B2
(45) Date of Patent: Jan. 17, 2012

(54) RECEPTION OF A SIGNAL TRANSMITTED OVER A TRANSMISSION LINK COMPRISING CODED CHANNELS

(75) Inventors: Marc Francois Henri Soler, Plascassier (FR); Arnaud Ange Rene Mellier, Cannes (FR)

(73) Assignee: ST-Ericsson SA, Geneva (CH)

( * ) Notice: Subject to any disclaimer, the term of this patent is extended or adjusted under 35 U.S.C. 154(b) by 565 days.

(21) Appl. No.: 11/721,672

(22) PCT Filed: Dec. 8, 2005

(86) PCT No.: PCT/IB2005/054124
§ 371 (c)(1),
(2), (4) Date: Sep. 23, 2009

(87) PCT Pub. No.: WO2006/064423
PCT Pub. Date: Jun. 22, 2006

(65) Prior Publication Data
US 2010/0040125 A1    Feb. 18, 2010

(30) Foreign Application Priority Data
Dec. 13, 2004 (EP) .................................. 04300882

(51) Int. Cl.
*G06F 1/00* (2006.01)
*H03M 13/00* (2006.01)
*H03H 7/27* (2006.01)
*H04L 27/06* (2006.01)

(52) U.S. Cl. .................. 375/229; 375/240.27; 375/265; 714/52; 714/752; 714/786

(58) Field of Classification Search .......... 375/229–236, 375/316, 240.26–240.29, 350, 265, 262, 375/263, 284–285, 324–326, 340–341; 714/48, 714/52, 57, 704–705, 752–755, 758–762, 714/768, 786–788, 791–792, 794–795, 798–805
See application file for complete search history.

(56) References Cited

U.S. PATENT DOCUMENTS

| | | | |
|---|---|---|---|
| 5,151,919 A * | 9/1992 | Dent | 370/209 |
| 5,602,858 A * | 2/1997 | Kitaori | 714/795 |
| 5,889,792 A * | 3/1999 | Zhang et al. | 714/784 |
| 5,995,171 A * | 11/1999 | Enari et al. | 375/240.27 |
| 6,028,901 A | 2/2000 | Huynh et al. | |
| 6,285,681 B1 * | 9/2001 | Kolze et al. | 370/442 |
| 6,553,535 B1 * | 4/2003 | Asada et al. | 714/777 |
| 6,622,280 B1 * | 9/2003 | Higashino | 714/789 |
| 7,200,797 B2 * | 4/2007 | Gueguen | 714/794 |
| 7,263,141 B1 * | 8/2007 | Parthasarathy et al. | 375/341 |
| 7,266,750 B1 * | 9/2007 | Patapoutian et al. | 714/758 |
| 7,298,727 B2 * | 11/2007 | Kim et al. | 370/342 |
| 7,305,605 B2 * | 12/2007 | Shirogane et al. | 714/751 |
| 7,318,187 B2 * | 1/2008 | Vayanos et al. | 714/776 |

(Continued)

*Primary Examiner* — David C. Payne
*Assistant Examiner* — Linda Wong
(74) *Attorney, Agent, or Firm* — William J. Kubida; Peter J. Meza; Hogan Lovells US LLP

(57) ABSTRACT

A method to receive a signal transmitted over a transmission link comprising coded channels, the method comprising: —equalization operations (110-116) to compensate for signal distortion introduced by the transmission link in a signal burst, and—block decoding operations (120-126) to perform channel decoding operation from the equalized signal bursts. If one of the block decoding operations has not been executed before a predetermined time limit, the method comprises at least one step (146) of discarding one of the next burst equalization operations.

6 Claims, 5 Drawing Sheets

U.S. PATENT DOCUMENTS

| | | | |
|---|---|---|---|
| 7,333,419 B2 * | 2/2008 | Mukhopadhyay et al. | 370/203 |
| 7,418,380 B2 * | 8/2008 | Chen et al. | 704/226 |
| 2001/0017904 A1 * | 8/2001 | Pukkila et al. | 375/350 |
| 2001/0033245 A1 * | 10/2001 | Campanale et al. | 341/200 |
| 2001/0033620 A1 * | 10/2001 | Itokawa | 375/240.28 |
| 2002/0008651 A1 * | 1/2002 | Bugeja et al. | 341/144 |
| 2002/0015401 A1 | 2/2002 | Subramanian et al. | |
| 2002/0067744 A1 * | 6/2002 | Fujii et al. | 370/535 |
| 2002/0125319 A1 * | 9/2002 | Sasaki et al. | 235/454 |
| 2002/0181634 A1 * | 12/2002 | Yang et al. | 375/354 |
| 2003/0048838 A1 | 3/2003 | Sexton et al. | |
| 2003/0224771 A1 * | 12/2003 | Nogueiro et al. | 455/418 |
| 2004/0210329 A1 * | 10/2004 | Chen et al. | 700/94 |
| 2005/0048982 A1 * | 3/2005 | Roland et al. | 455/449 |
| 2005/0079870 A1 * | 4/2005 | Rick et al. | 455/437 |
| 2005/0169205 A1 * | 8/2005 | Grilli et al. | 370/313 |
| 2005/0193309 A1 * | 9/2005 | Grilli et al. | 714/752 |
| 2006/0012476 A1 * | 1/2006 | Markhovsky et al. | 340/539.32 |
| 2006/0039503 A1 * | 2/2006 | Choi et al. | 375/301 |

* cited by examiner

US 8,098,721 B2

RECEPTION OF A SIGNAL TRANSMITTED OVER A TRANSMISSION LINK COMPRISING CODED CHANNELS

FIELD OF THE INVENTION

The present invention relates to a reception of a signal transmitted over a transmission link comprising coded channels.

BACKGROUND OF THE INVENTION

Typically, a method to receive a signal transmitted over a TDMA (Time Division Multiple Access) transmission link comprising coded channels, has:
  equalization operations to compensate for signal distortion introduced by the transmission link in a signal burst, and
  block decoding operations to perform channel decoding operation from the equalized signal bursts.

Such a signal receiving method is carried out by a signal processor. A signal processor can handle only a limited workload because it is only capable of executing a certain number of instructions per second. Typically, this number of instructions per second is expressed in Mips (Million of Instructions per second).

Nowadays, a significant amount of Mips on a signal processor are needed to run other applications simultaneously with the signal receiving method. Other applications can be AMR (Adaptive Multi-Rate) encoding but also applications which are activated by a user like ring generation, music playing or entertainment games, for example.

However, the amount of Mips on a signal processor is limited by other considerations like the necessity not to exceed a limited processor frequency compatible with a low power consumption.

SUMMARY OF THE INVENTION

Accordingly, it is an object of the invention to provide a method to receive a signal which saves a significant amount of Mips on a signal processor.

The invention provides a method to receive a signal transmitted over a transmission link, wherein if one of the block decoding operations has not been executed before a predetermined time limit, it comprises at least one step of discarding one of the next burst equalization operations.

Discarding a burst equalization step saves processing time and a certain amount of Mips on a signal processor. However, it also alters the quality of the received signal since an equalized burst will be missing for the block decoding step. However, here, a burst equalization step is discarded only if the block decoding step becomes late due to an excessive workload. As a result, the quality of the received signal is altered or likely to be altered only if the workload of the signal processor becomes too important to be handled timely.

Furthermore, most of the time, the missing equalized signal burst does not impact the quality of the received signal because the missing equalized signal burst can be recovered during the channel decoding step using the redundancy introduced in the received signal by an emitter.

The features of claim 2 provide the advantage of reducing the quality of a received signal only on one channel.

The features of claim 3 provide the advantage of uniformly reducing the quality of every signal receiving channel.

The invention also relates to a receiver and to a telephone adapted to carry out the above method.

This and other aspects of the invention will be apparent from the following description, drawings and claims.

DESCRIPTION OF THE PREFERRED EMBODIMENTS

Figure 1:
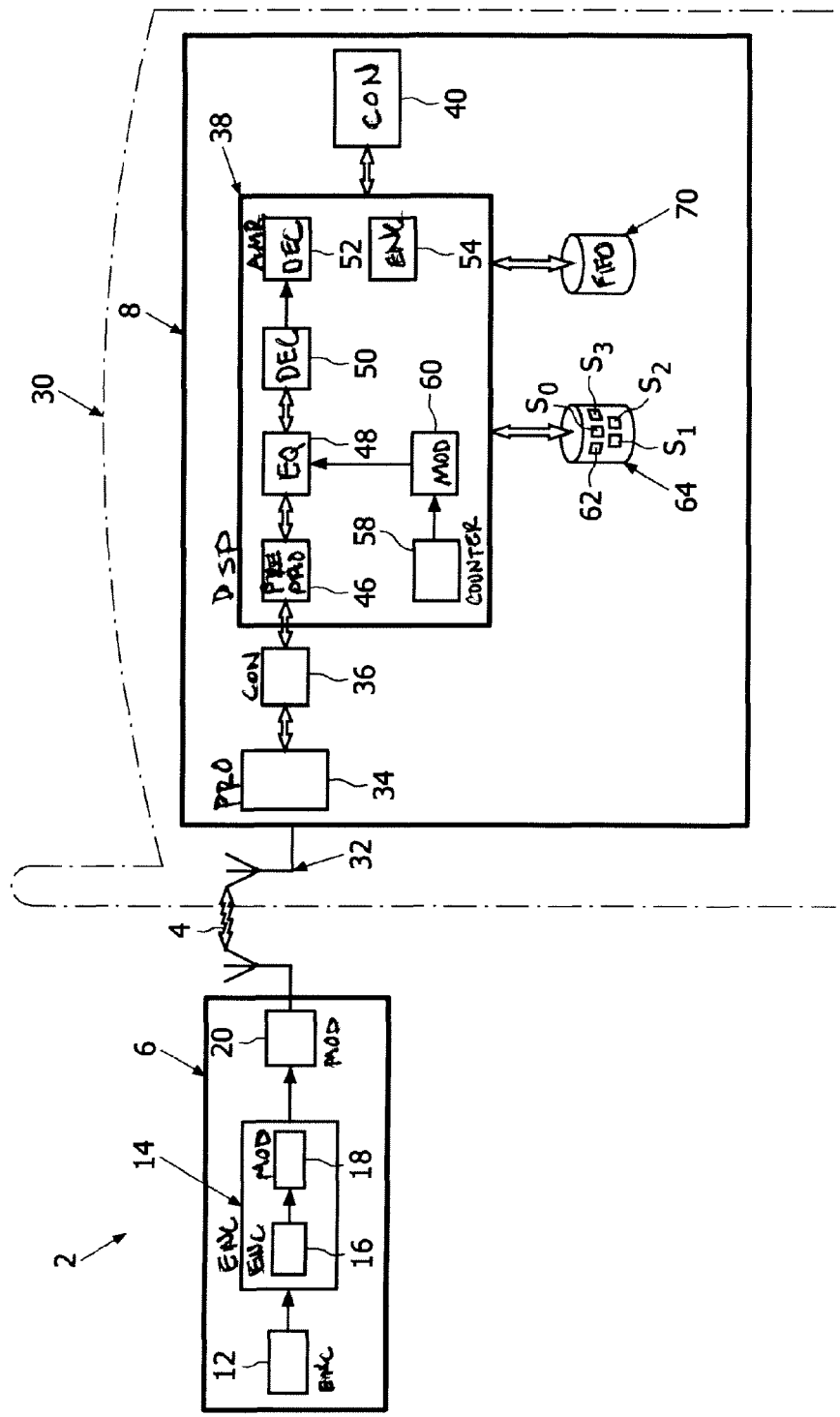
FIG. 1 is a schematic diagram of a signal transmission system.

FIG. 1 shows a system 2 to transmit a signal over a TDMA transmission link 4 between an emitter 6 and a receiver 8.

For example, system 2 is conformed to the EDGE (Enhanced Data rate for Global Evolution) GSM (Global System for Mobile Communications) standards. The terminology used in this description is the terminology used in these standards.

FIG. 1 shows only the details necessary to understand the invention.

Emitter 6 has a speech encoder 12 to perform source coding operations. Source coding operations cancel the redundancy of a speech signal to compress it.

Speech encoder 12 outputs a bit stream which is transmitted to a channel encoder 14. Each bit is either a logical "1" or a logical "0". Channel encoder 14 performs channel encoding operations to add some redundancy in the processed bit stream to make it more resistant against transmission errors.

In an EDGE GSM system, channel encoder 14 includes a convolutional encoder 16 connected to an input of a puncturing module 18.

The convolutional encoder adds redundancy. For example, for one inputted bit of the bit stream, it outputs three bits.

For example, puncturing module 18 selects two bits out of three bits in the bit stream outputted by encoder 16.

Puncturing module 18 outputs a bit stream which is transmitted to an eight PSK (Phase Shift Keying) modulator 20.

The modulated signal outputted by modulator 20 is transmitted over the air through communication link 4.

In system 2, a TDMA technique is implemented to share a carrier frequency among several receivers.

Figure 2:
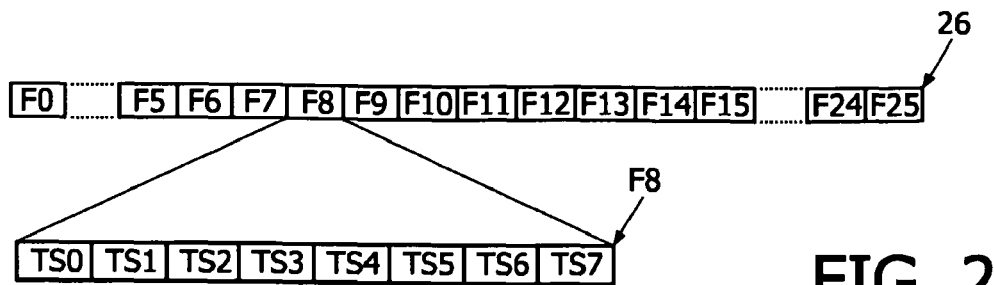
FIG. 2 is a schematic diagram of the structure of a signal transmitted in the system of FIG. 1.

Referring to FIG. 2, the structure of a signal transmitted through link 4 is shown.

The transmitted signal is divided into multi-frames.

In FIG. 2, for simplicity, only one multi-frame 26 is shown. Multi-frame 26 is divided into 26 GSM frames. Only frame F0, F5 to F15, F24 and F25 are shown.

The structure of frames F5 to F15 is identical. Thus, only the structure of frame F8 is shown in detail in FIG. 2.

Frame F8 is divided into eight identical time slots TS0 to TS7. Each time slot contains a signal burst.

One time slot in several successive frames is allocated to a receiver. This succession of time slots corresponds to one coded channel. In an EDGE GSM system, four time slots in a same frame can be allocated to the same receiver to increase the bandwidth of link 4 usable to transmit a signal to this receiver.

The above frame structure is described in more details in the GSM standard and in the EDGE standard.

Receiver 8 is included in a user equipment like a mobile phone 30.

Receiver 8 is connected to an antenna 32 to receive the transmitted signal and includes a baseband processor 34 connected to antenna 32 to demodulate the received signal.

Baseband processor 34 outputs a baseband signal to an analog-to-digital converter 36.

The digitalized signal outputted by converter 36 is transmitted to a digital signal processor (DSP) 38. DSP 38 operates under the control of a DSP controller 40.

DSP 38 is a dedicated hardware especially designed to rapidly process the received signal. Typically, data exchange between controller 40 and DSP 38 does only occur at the end of each processed frame.

DSP 38 includes, to process the received signal:

a pre-processor 46 to filter the signal outputted by converter 36, an equalizer 48 to correct the burst of the received frames after filtering by the pre-processor, a channel decoder 50 to correct the received signal using several equalized signal bursts and exploiting the redundancy introduced by channel encoder 14, and an AMR speech decoder 52 to perform speech decoding operations to decompress the signal compressed by speech encoder 12.

For example, pre-processor 46 is a FIR (Finite Impulse Response) filter.

Equalizer 48 is especially designed to correct the error in the received signal due to multi-path reflections.

Elements 46 to 52 are described in more details in EDGE and GSM standards.

Some other modules are implemented in DSP 38 to run other applications simultaneously with the reception of a signal. For example, an AMR speech encoder 54 is implemented in DSP 38.

Finally, DSP 38 has a quarter-bits time counter 58 and a discarding control module 60.

Counter 58 counts a number of elapsed quarter-bits since the beginning of the reception of a multi-frame. The definition of the term "quarter-bit" can be found in the GSM standard. A frame is 5000 quarter bits long. Counter 58 is designed to measure in quarter-bits the starting time of the execution of any operation in DSP 38.

Module 60 is designed to deactivate equalizer 48 when the workload of DSP 38 grows too heavy.

Module 60 operates according to a predetermined selecting rule 62 recorded in a memory 64 connected to DSP 38. Memory 64 also includes the values of four predetermined time limits $S_0$ to $S_3$. For instance, time limits $S_0$, $S_1$, $S_2$, $S_3$ are equal to 6000, 10000, 13000 and 13000 quarter-bits, respectively.

Figure 3:
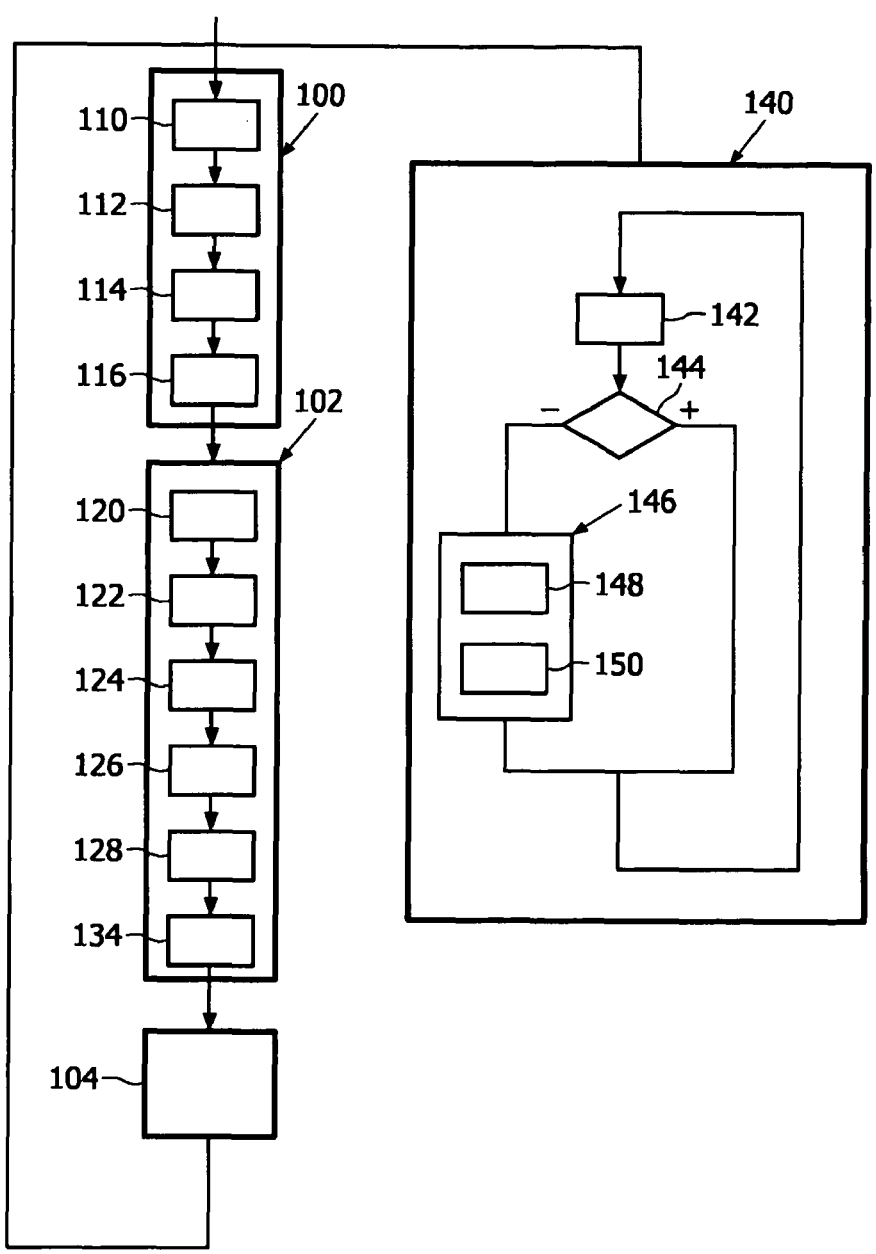
FIG. 3 is a flowchart of a method to receive a signal transmitted using the system of FIG. 1.

Module 60 is designed to operate according to the method of FIG. 3.

DSP 38 is also connected to a FIFO (First In First Out) stack 70 used to memorize background tasks that have to be executed by DSP 38.

The operation of receiver 8 will now be described with reference to FIGS. 3 to 6 in the particular case of the processing of frames F8 to F11.

DSP 38 has to execute two types of tasks. The first type of tasks called "foreground task" are high priority tasks that must be executed in real time and cannot be interrupted.

The second type of tasks, called "Background Tasks", are affected with a lower priority so that they are only executed after the foreground tasks and they can be interrupted by a task with a higher priority.

Thus, DSP 38 repeatedly processes as follows:

in step 100, DSP 38 executes foreground tasks, then in step 102, DSP 38 executes background tasks recorded in stack 70 according to a FIFO order, and then in step 104, DSP 38 interrupts the execution of the background tasks and records them in stack 70 upon occurrence of a new foreground task.

In receiver 8, the foreground tasks are the tasks performed by pre-processor 46 and by equalizer 48, i.e. signal burst equalization tasks. For every received frame, an equalization task is to be performed for every channel allocated to receiver 8. Here, four channels corresponding to time slots TS0 to TS3 are allocated to receiver 8 so DSP 38 performs four equalization tasks for each received frame. Therefore, step 100 comprises four burst equalization operations 110, 112, 114 and 116 for time slots TS0 to TS3, respectively.

Figure 4:
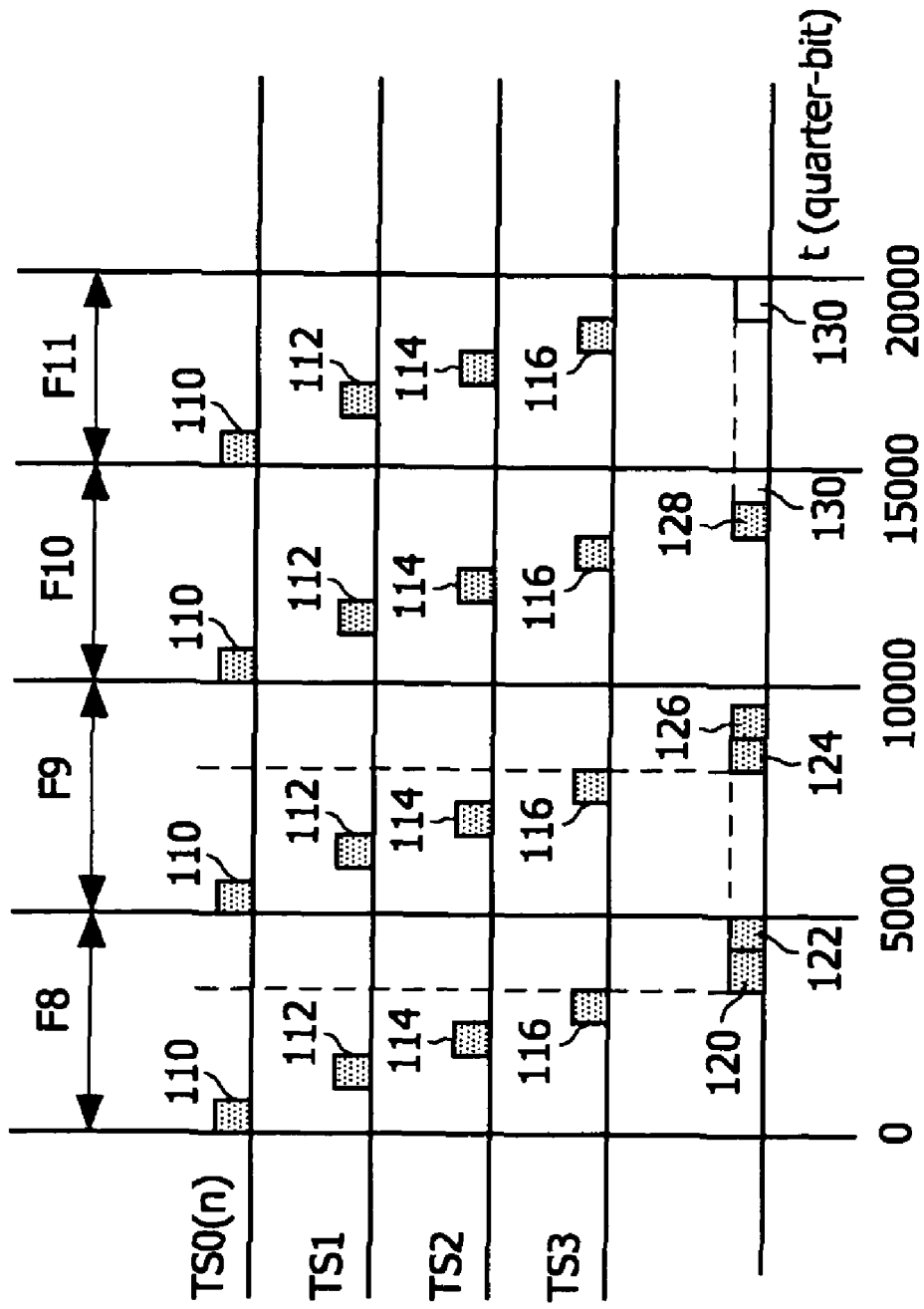
FIGS. 4 to 6 are examples of timing chart of the task carried out for receiving a signal according to the method of FIG. 3.
Figure 5:
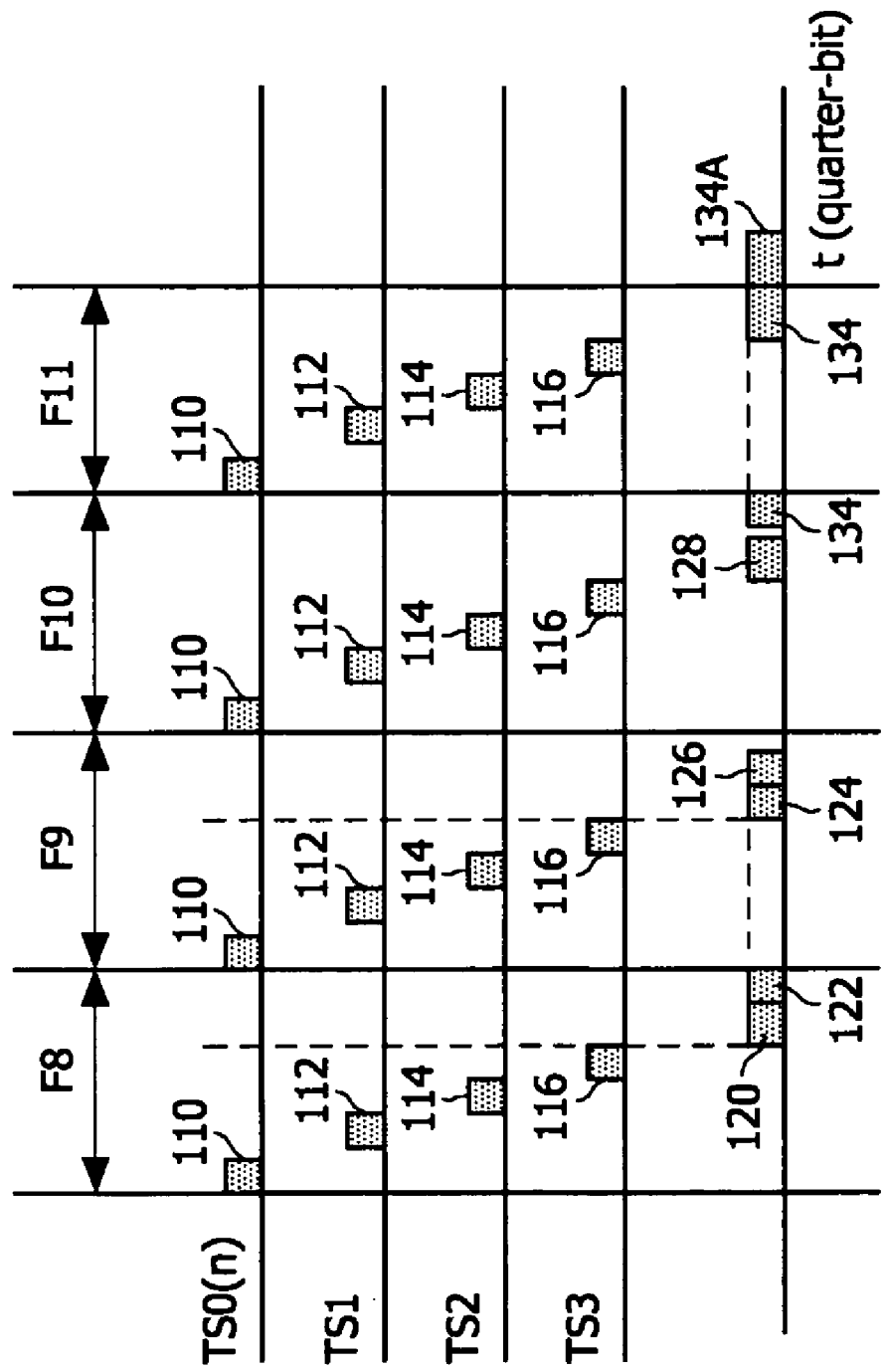
Figure 6:
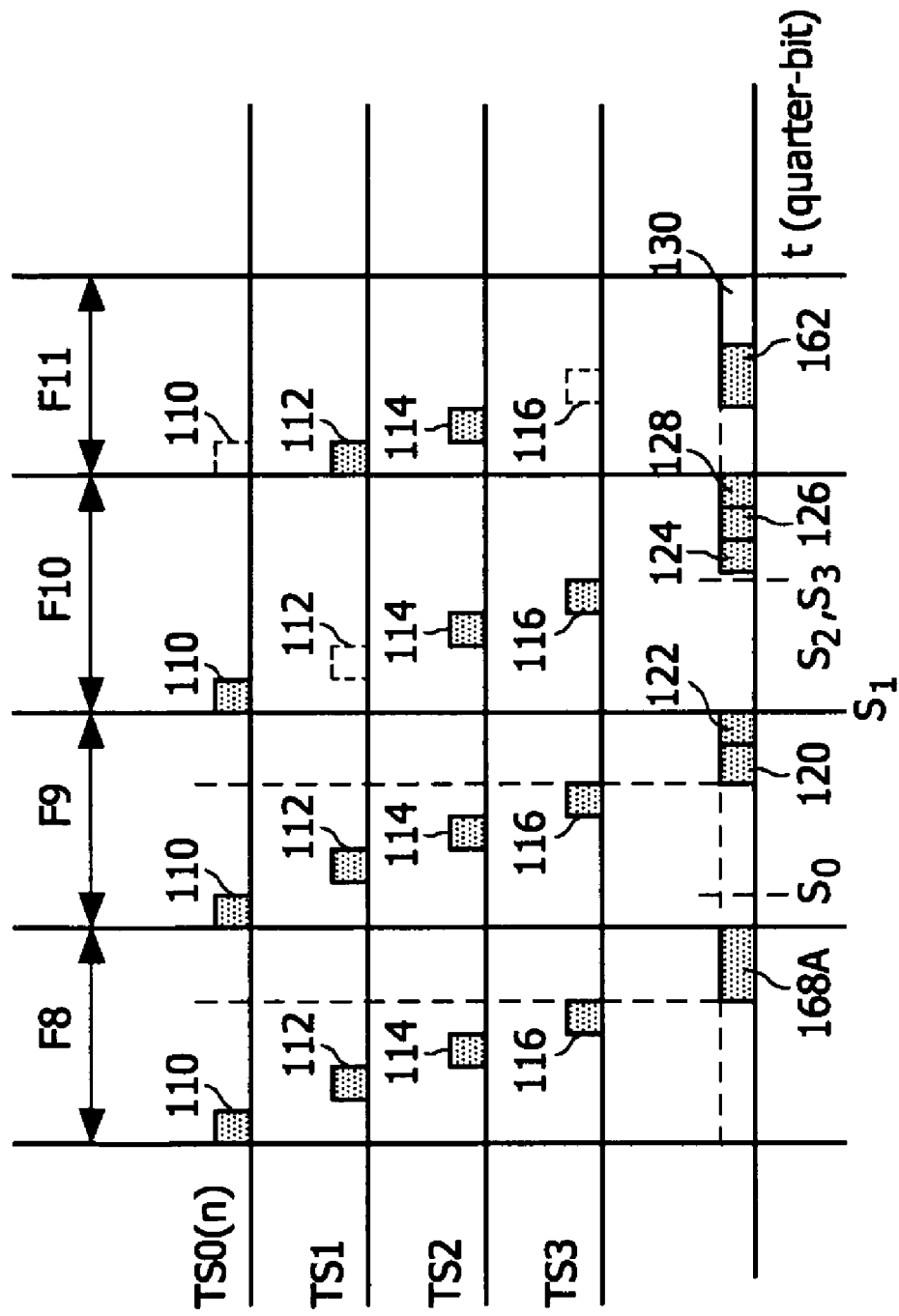

These operations 110, 112, 114 and 116 are also represented according to time t in FIGS. 4 to 6. In FIGS. 4 to 6, time intervals F8 to F11 represent the time interval during which frames F8 to F11 are received, respectively. These time intervals are 5000 quarter-bit long.

As shown in these figures, during the reception of frame F8, DSP 38 first executes:

operation 110, for time slot TS0, then operation 112, for time slot TS1, then operation 114, for time slot TS2, then operation 116, for time slot TS3.

For each received frame, these operations 110, 112, 114 and 116 are always executed before the background tasks. Each step 110, 112, 114 and 116 uses about 4 Mips.

During time intervals F8 to F11, DSP 38 has to execute one channel decoding step for every channel allocated to receiver 8. Here, DSP 38 executes four channel decoding operations 120, 122, 124 and 126 during the reception of frames F8 to F11. The channel decoding operations are illustrated in FIGS. 4 to 6.

Channel decoding operations are background tasks and are executed during step 102 only after the execution of front ground tasks.

Channel decoding operations can only be carried out once a predetermined number of frames has been received. For example, the predetermined number of frames is equal to four. Thus, channel decoding operations 122-126 are intended to process the bursts equalized during the previously received frames F4 to F7.

Operations 122-126 perform channel decoding operations for signal bursts received during time slots TS0 to TS3, respectively.

During each frame, operations 122-126 can only be executed after operations 110-116.

After the four channel decoding operations 122-126, DSP 38 has to execute an AMR speech decoding operation 128. Operation 128 is also a background task and is executed during the reception of frame F10 in FIG. 4, for example.

If no other background tasks have to be executed by DSP 38 then, there remains some free processing time available during time intervals F10 and F11 indicated by boxes 130 (FIG. 4). This free processing time corresponds to a certain amount of unused Mips on DSP 38. This free processing time can be used to execute other background tasks in parallel to the reception of signal.

For example, another background task is an AMR speech encoding operation 134 (FIG. 5) executed by encoder 54. However, if operation 134 is too long to be carried out during the free processing time 130, it will be interrupted in step 104 and a remaining part 134A (FIG. 5) of operation 134 will be recorded in stack 70. This remaining part 134A has to be executed subsequently. For example, the remaining part 134A is executed during the reception of frame F12 and this will delay all the operations 122-128.

In the prior art, if the remaining part 134A requires a large amount of Mips or if several other background tasks are to be executed in parallel to the reception of a signal, the number of tasks recorded in stack 70 grows and may exceed the capacity of stack 70. If the capacity of stack 70 is exceeded, a situation called "real time overflow" occurs and the connection with the emitter is suddenly lost.

In the embodiment disclosed herein, in parallel to step 102 to 104, the discarding control module 60 performs a time limit checking step 140.

Channel decoding operations 122-126 are associated to time limits $S_0$, $S_1$, $S_2$, and $S_3$, respectively.

In real time, during an operation 142, module 60 receives from the quarter-bit counter 58 the starting time of each operation 120-126.

Then, during operation 144, module 60 compares the received starting time to corresponding time limit $S_1$ among time limits $S_0$ to S3.

Each time that a received starting time for an operation 122-126 is less than its associated time limit $S_1$, nothing happens and the method returns to operation 142.

If the received starting time for an operation 122-126 is greater than its associated time limit $S_1$, then, in operation 146, module 60 commands equalizer 48 to discard one of the next equalization operations to free some processing time.

More precisely, in sub-operation 148, module 60 selects the next equalization operation to discard according to pre-determined rule 64. For instance, rule 64 uniformly spread the selected equalization operations over each channel.

Subsequently, in sub-operation 150, module 60 controls equalizer 48 to skip the selected equalization operation.

Referring to FIG. 6, a remaining part 168A of a background task is executed during time interval F8. For example, remaining part 168A is identical to remaining part 134A. Thus, operations 120, 122, 124 and 126 are delayed and executed during time intervals F9 and F10. Operation 120 starts after its associated time limits $S_0$ and module 60 proceeds to operation 146. As a result, an equalization operation 112 indicated in dotted line in FIG. 6, is discarded during time interval F10.

Operation 122 takes place before time limit SI and this does not trigger a discarding operation 146.

Operations 124 and 126 start after time limits $S_2$ and $S_3$, respectively. As a result, module 60 controls pre-processor 46 and equalizer 48 to discard equalization operations 110 and 116 during time interval F11. Discarded operations 110 and 116 are indicated by dotted lines in FIG. 6.

In the situation illustrated in FIG. 6, the saved processing time corresponds to an amount of 12 Mips and the saved processing time is used to completely execute another background task 162 which, otherwise, would have to be interrupted before its complete completion. In FIG. 6, some unused free time 130 exists at the end of time interval F11.

During the processing of next frames F12 to F15, operation 120, 122 and 126 will have to be performed using only three equalized bursts instead of four. This means that one bit out of four bit of information will be missing. However, channel decoder 50 treats these missing bits as a transmission error and tries to correct such an error using the redundancy of the received signal. It is expected that when only one bit out of four is missing, channel decoder 50 is able to recover missing bits and to correct the received signal so that the user will perceive no quality deterioration of this signal. However, if too many equalized bursts are missing, the quality of the received signal will progressively decrease.

The use of a discarding control module 60 and the implementation of the method of FIG. 3 avoid real time overflow and sudden connection lost. In reality, when the number of tasks to be executed in parallel in DSP 38 increases, the quality of the received signal smoothly decreases as the number of tasks to be executed in parallel increase.

Many additional embodiments are possible. For example, many other predetermined discarding rules may be implemented. For instance, it is expected that the deterioration of the quality of the signal will be more difficult to perceive by the user if sub-operation 148 preferentially selects the burst equalization step of one channel.

System 2 has been described in the special case of a system which complies with EDGE GSM standards. However, the above teachings can be applied to other generations of GSM standards.

The invention claimed is:

1. A method to receive a speech signal transmitted over a wireless transmission link comprising coded channels, the method comprising:

processing said signal using a digital signal processor having to execute two different types of tasks, a first type of task having higher priority and being executed in the foreground in real time without interruption, and a second type of task having lower priority and being executed in the background;

equalization operations to compensate for signal distortion introduced by the transmission link in a signal burst, said equalization being arranged as a foreground task; and block decoding operations to perform channel decoding operation from the equalized signal bursts, said block decoding being arranged as a background task, wherein if one of the block decoding operations has not been executed before a predetermined time limit, it comprises at least one step of commanding said equalizer to discard one of the next burst equalization operations according to a predetermined rule, said discarded equalization operation being treated as a transmission error corrected using a redundancy of the signal.

2. The method according to claim 1, wherein the discarding step is adapted to preferentially discard the burst equalization operations concerning one coded channel.

3. The method according to claim 1, wherein the discarding step selects the next equalization operation to discard according to a predetermined rule.

4. A receiver to receive a speech signal transmitted over a wireless transmission link comprising coded channels, the receiver comprising:

a digital signal processor for processing the signal, said digital signal processor being arranged to execute two different types of tasks, a first type of task of higher priority being executed in the foreground in real time without interruption, and a second type of task of lower priority being executed in the background;

an equalizer adapted to perform burst equalization operations to compensate for signal distortion introduced by the transmission link in a signal burst, said equalization being arranged as a foreground task;

a channel decoder to perform channel decoding operations from the equalized signal bursts being arranged as a background task; and a discarding control module adapted to control the equalizer to discard at least one of the next burst equalization operations to perform, if the channel decoder does not execute a channel decoding operation before a predetermined time limit, the next operation to discard being selected according to a predetermined rule, said discarded equalization operation being treated as a transmission error corrected using a redundancy of the signal.

5. The receiver according to claim 4, wherein the receiver is configured to simultaneously receive a number of coded channels greater than two.

6. A telephone comprising a receiver according to claim 4.

* * * * *